United States Patent
Ahn et al.

(10) Patent No.: US 11,038,175 B2
(45) Date of Patent: Jun. 15, 2021

(54) POSITIVE ELECTRODE ACTIVE MATERIAL PRE-DISPERSION COMPOSITION INCLUDING HYDROGENATED NITRILE BUTADIENE RUBBER AS DISPERSANT, POSITIVE ELECTRODE FOR SECONDARY BATTERY, AND LITHIUM SECONDARY BATTERY INCLUDING THE POSITIVE ELECTRODE

(71) Applicant: LG Chem, Ltd., Seoul (KR)

(72) Inventors: Byoung Hoon Ahn, Daejeon (KR); Houng Sik Yoo, Daejeon (KR); Chang Wan Koo, Daejeon (KR); Hyun Chul Ha, Daejeon (KR); Sang Hoon Choy, Daejeon (KR); Jong Won Lee, Daejeon (KR); Dong Hyun Kim, Daejeon (KR); Gye Min Kwon, Daejeon (KR)

(73) Assignee: LG Chem, Ltd.

( * ) Notice: Subject to any disclaimer, the term of this patent is extended or adjusted under 35 U.S.C. 154(b) by 129 days.

(21) Appl. No.: 16/338,154

(22) PCT Filed: Mar. 22, 2018

(86) PCT No.: PCT/KR2018/003391
§ 371 (c)(1),
(2) Date: Mar. 29, 2019

(87) PCT Pub. No.: WO2018/174616
PCT Pub. Date: Sep. 27, 2018

(65) Prior Publication Data
US 2020/0028174 A1    Jan. 23, 2020

(30) Foreign Application Priority Data
Mar. 22, 2017 (KR) .................. 10-2017-0036334
Mar. 22, 2018 (KR) .................. 10-2018-0033253

(51) Int. Cl.
*H01M 4/62* (2006.01)
*H01M 4/136* (2010.01)
(Continued)

(52) U.S. Cl.
CPC .............. *H01M 4/62* (2013.01); *H01M 4/136* (2013.01); *H01M 4/5825* (2013.01); *H01M 10/0525* (2013.01); *H01M 2004/028* (2013.01)

(58) Field of Classification Search
CPC ....... H01M 4/62; H01M 4/136; H01M 4/5825
(Continued)

(56) References Cited

U.S. PATENT DOCUMENTS

2009/0317718 A1    12/2009 Imachi et al.
2012/0028117 A1    2/2012 Plee et al.
(Continued)

FOREIGN PATENT DOCUMENTS

CN    103199249 A  *  7/2013
EP    2618409 A1       7/2013
(Continued)

OTHER PUBLICATIONS

Search report from International Application No. PCT/KR2018/003391, dated Jul. 3, 2018.
(Continued)

*Primary Examiner* — Sean P Cullen
(74) *Attorney, Agent, or Firm* — Lerner, David, Littenberg, Krumholz & Mentlik, LLP

(57) ABSTRACT

The present invention relates to a positive electrode active material pre-dispersion composition which includes a lithium iron phosphate-based positive electrode active material, a dispersant, and a solvent, wherein the dispersant includes a hydrogenated nitrile butadiene rubber (HNBR), a slurry composition for a secondary battery positive electrode which is prepared by using the positive electrode active
(Continued)

material pre-dispersion composition, a positive electrode for a secondary battery, and a lithium secondary battery including the positive electrode.

13 Claims, 2 Drawing Sheets

(51) Int. Cl.
*H01M 4/58* (2010.01)
*H01M 10/0525* (2010.01)
*H01M 4/02* (2006.01)

(58) Field of Classification Search
USPC ........................................................ 429/217
See application file for complete search history.

(56) References Cited

U.S. PATENT DOCUMENTS

| | | | |
|---|---|---|---|
| 2013/0183577 A1* | 7/2013 | Voillequin | H01M 4/5825 |
| | | | 429/188 |
| 2013/0244098 A1 | 9/2013 | Voillequin et al. | |
| 2014/0295276 A1 | 10/2014 | Takami et al. | |
| 2015/0083976 A1 | 3/2015 | Rao et al. | |
| 2015/0200399 A1* | 7/2015 | Yeou | H01M 4/131 |
| | | | 429/217 |
| 2018/0053932 A1 | 2/2018 | Jeong | |
| 2018/0090764 A1* | 3/2018 | Fukumine | H01M 4/04 |
| 2018/0226650 A1 | 8/2018 | Yoo et al. | |
| 2020/0044238 A1* | 2/2020 | Ahn | H01M 4/58 |

FOREIGN PATENT DOCUMENTS

| | | | | |
|---|---|---|---|---|
| EP | 2639860 A1 | 9/2013 | | |
| JP | 2005251554 A | 9/2005 | | |
| JP | 2009081072 A | 4/2009 | | |
| JP | 2011014457 A | 1/2011 | | |
| JP | 2012521065 A | 9/2012 | | |
| JP | 2014194927 A | * | 10/2014 | |
| JP | 2014194927 A | 10/2014 | | |
| JP | 2014209463 A | 11/2014 | | |
| KR | 20150016852 A | 2/2015 | | |
| KR | 20150033536 A | 4/2015 | | |
| KR | 20160087657 A | 7/2016 | | |
| WO | WO-2016157842 A1 | * | 10/2016 | ............ C08F 236/04 |
| WO | 2017043818 A1 | 3/2017 | | |

OTHER PUBLICATIONS

Arlanxeo Corporation: "THERBAN 4307 Product Specification", Arlanxeo Performance Elastomers, May 20, 2016, pp. 1-2, XP055615401.

Extended European Search Report including Written Opinion for Application No. EP18772020.6 dated Sep. 5, 2019.

* cited by examiner

POSITIVE ELECTRODE ACTIVE MATERIAL PRE-DISPERSION COMPOSITION INCLUDING HYDROGENATED NITRILE BUTADIENE RUBBER AS DISPERSANT, POSITIVE ELECTRODE FOR SECONDARY BATTERY, AND LITHIUM SECONDARY BATTERY INCLUDING THE POSITIVE ELECTRODE

CROSS-REFERENCE TO RELATED APPLICATIONS

This application is a national phase entry under 35 U.S.C. § 371 of International Application No. PCT/KR2018/003391, filed Mar. 22, 2018, which claims priority to Korean Patent Application No. 10-2017-0036334, filed on Mar. 22, 2017, and Korean Patent Application No. 10-2018-0033253, filed on Mar. 22, 2018, the disclosures of which are incorporated herein in their entirety by reference.

TECHNICAL FIELD

The present invention relates to a positive electrode active material pre-dispersion composition, a slurry composition for a secondary battery positive electrode, a positive electrode for a secondary battery, and a lithium secondary battery including the positive electrode.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

A lithium-containing cobalt oxide ($LiCoO_2$) having a high operating voltage and excellent capacity characteristics has been used as a main component of a positive electrode active material of a conventional lithium secondary battery, wherein, since the lithium-containing cobalt oxide has very poor thermal properties due to an unstable crystal structure caused by lithium deintercalation and is expensive, there is a limitation in that mass production of the lithium secondary battery is difficult.

Recently, a lithium iron phosphate-based ($LiFePO_4$) compound, which not only has better high-temperature stability than cobalt, but is also inexpensive while having a voltage of ~3.5 V vs. lithium, a high bulk density of about 3.6 $g/cm^3$, and a theoretical capacity of about 170 mAh/g, is in the spotlight as a positive electrode active material of a lithium secondary battery.

The lithium iron phosphate-based positive electrode active material is a structurally very stable positive electrode active material, but is disadvantageous in that electrical conductivity and ionic conductivity are low. Thus, the lithium iron phosphate-based positive electrode active material is used in such a manner that the electrical conductivity is improved by coating the surface of the lithium iron phosphate-based positive electrode active material with carbon, and the ionic conductivity is improved by reducing a particle size of the lithium iron phosphate-based positive electrode active material.

However, since a specific surface area was increased and agglomeration of positive electrode active material particles severely occurred as the particle size of the positive electrode active material was reduced, there were limitations in that dispersion was difficult.

DISCLOSURE OF THE INVENTION

Technical Problem

An aspect of the present invention provides a positive electrode active material pre-dispersion composition, in which agglomeration of a lithium iron phosphate-based positive electrode active material with a reduced particle size is suppressed, dispersibility is improved, flowability is improved by reducing viscosity, and a final solid content is increased, a slurry composition for a secondary battery positive electrode, a positive electrode for a secondary battery, and a lithium secondary battery including the positive electrode.

Technical Solution

According to an aspect of the present invention, there is provided a positive electrode active material pre-dispersion composition including a lithium iron phosphate-based positive electrode active material, a dispersant, and a solvent, wherein the dispersant includes a hydrogenated nitrile butadiene rubber (HNBR).

According to another aspect of the present invention, there is provided a slurry composition for a secondary battery positive electrode which further includes a conductive agent and a binder in addition to the positive electrode active material pre-dispersion composition.

According to another aspect of the present invention, there is provided a positive electrode for a secondary battery, which is prepared by using the slurry composition for a secondary battery positive electrode, and a lithium secondary battery including the positive electrode.

Advantageous Effects

According to the present invention, a dispersion particle size may be reduced by suppressing agglomeration of a lithium iron phosphate-based positive electrode active material with a reduced particle size and improving dispersibility, processability may be improved by improving flowability by decreasing viscosity of a positive electrode active material pre-dispersion and a positive electrode slurry, and a final solid content may be increased.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
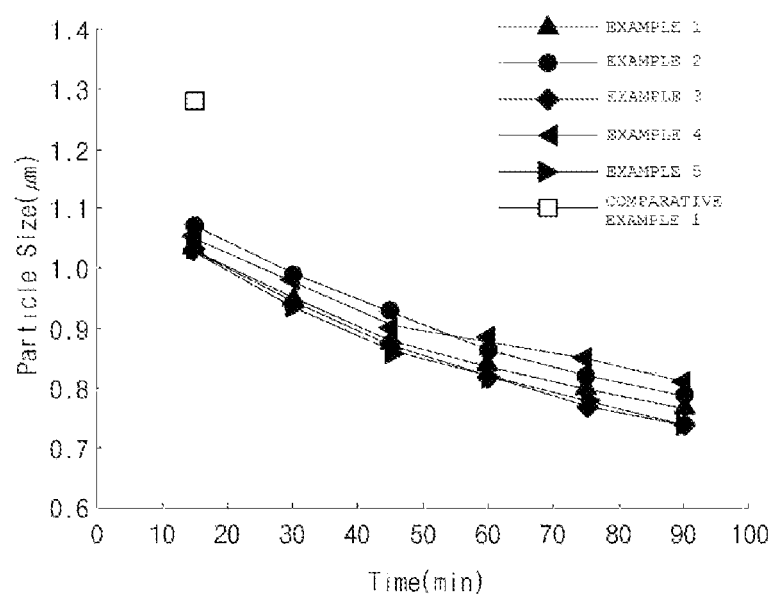
FIG. 1 is a graph illustrating a change in particle size vs. dispersion time of positive electrode active material pre-dispersions according to Examples 1 to 5 and Comparative Example 1.

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

A positive electrode active material pre-dispersion composition of the present invention includes a lithium iron phosphate-based positive electrode active material, a dispersant, and a solvent, wherein the dispersant includes a hydrogenated nitrile butadiene rubber (HNBR).

The present invention provides a positive electrode active material pre-dispersion composition in which a lithium iron phosphate-based positive electrode active material is pre-dispersed by adding the lithium iron phosphate-based positive electrode active material and a dispersant together to a solvent to improve dispersibility of the lithium iron phosphate-based positive electrode active material. The positive electrode active material pre-dispersion composition, in which the lithium iron phosphate-based positive electrode active material is pre-dispersed, is prepared, and subsequently, a conductive agent and a binder are mixed therewith to prepare a positive electrode slurry composition.

In this case, the dispersant must be included in the positive electrode active material pre-dispersion composition of the present invention, wherein, in the present invention, a hydrogenated nitrile butadiene rubber (HNBR) is included as the dispersant of the positive electrode active material pre-dispersion. The hydrogenated nitrile butadiene rubber (HNBR) denotes one in which a double bond originally included in a nitrile butadiene rubber (NBR) becomes a single bond by hydrogenation of the nitrile butadiene rubber (NBR).

The hydrogenated nitrile butadiene rubber (HNBR) dispersant includes a repeating unit derived from acrylonitrile (AN) in an amount of 20 wt % to 50 wt %, more preferably 25 wt % to 45 wt %, and most preferably 30 wt % to 40 wt % based on a total weight of the hydrogenated nitrile butadiene rubber (HNBR).

A hydrogenated butadiene (HBD) ratio in the hydrogenated nitrile butadiene rubber (HNBR) dispersant may satisfy the following Equation 1.

$$1(\%) \leq HBD\ wt\ \%/(BD+HBD)\ wt\ \% \times 100 \leq 30(\%) \quad \text{[Equation 1]}$$

In Equation 1, HBD wt % is weight % of a hydrogenated butadiene (HBD)-derived repeating unit based on a total weight of the hydrogenated nitrile butadiene rubber (HNBR), and (BD+HBD) wt % is weight % of a butadiene (BD)-derived repeating unit and the hydrogenated butadiene (HBD)-derived repeating unit based on the total weight of the hydrogenated nitrile butadiene rubber (HNBR).

The hydrogenated butadiene (HBD) ratio of Equation 1 may be more preferably in a range of 5% to 25% and may be most preferably in a range of 10% to 25%.

In a case in which the hydrogenated butadiene (HBD) ratio of Equation 1 is less than 1%, since adhesion to a surface of a carbon coating coated on a surface of the positive electrode active material is reduced, wetting is not well performed during the preparation of a dispersion, and thus, dispersibility may be reduced. In a case in which the hydrogenated butadiene (HBD) ratio is greater than 30%, solubility of the hydrogenated nitrile butadiene rubber in a dispersion medium may be reduced.

The hydrogenated nitrile butadiene rubber (HNBR) dispersant may have a weight-average molecular weight (MW) of 10,000 to 700,000, more preferably 25,000 to 600,000, and most preferably 200,000 to 400,000.

The lithium iron phosphate-based positive electrode active material included in the positive electrode active material pre-dispersion composition may be a primary particle having an average particle diameter ($D_{50}$) of less than 1 μm.

The lithium iron phosphate-based positive electrode active material is a structurally very stable positive electrode active material, but is disadvantageous in that electrical conductivity and ionic conductivity are low. Thus, the lithium iron phosphate-based positive electrode active material is used in such a manner that the electrical conductivity is improved by coating the surface of the lithium iron phosphate-based positive electrode active material with carbon, and the ionic conductivity is improved by reducing a particle size of the lithium iron phosphate-based positive electrode active material.

Typically, since agglomeration of positive electrode active material particles severely occurred as the particle size of the lithium iron phosphate-based positive electrode active material was reduced, dispersion was difficult.

However, in the present invention, since the positive electrode active material pre-dispersion composition, in which the lithium iron phosphate-based positive electrode active material is pre-dispersed by using the hydrogenated nitrile butadiene rubber (HNBR) dispersant, is provided, the dispersibility issues of the lithium iron phosphate-based positive electrode active material with a reduced particle size are addressed.

Thus, the lithium iron phosphate-based positive electrode active material included in the positive electrode active material pre-dispersion composition of the present invention may be dispersed as a primary particle having an average particle diameter ($D_{50}$) of less than 2 μm, preferably less than 1.2 μm, more preferably less than 1 μm, and most preferably less than 0.8 μm.

The lithium iron phosphate-based positive electrode active material may be represented by the following Formula 1.

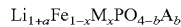   [Formula 1]

In Formula 1, M is at least one selected from the group consisting of manganese (Mn), nickel (Ni), cobalt (Co), copper (Cu), scandium (Sc), titanium (Ti), chromium (Cr), vanadium (V), and zinc (Zn), A is at least one selected from the group consisting of sulfur (S), selenium (Se), fluorine (F), chlorine (Cl), and iodine (I), $-0.5 < a < 0.5$, $0 \leq x < 0.5$, and $0 \leq b \leq 0.1$.

For example, the lithium iron phosphate-based positive electrode active material may be $LiFePO_4$. Also, in order to improve the electrical conductivity of the lithium iron phosphate-based positive electrode active material, the surface of the particle may be coated with a carbon-based material.

The positive electrode active material pre-dispersion composition may include the hydrogenated nitrile butadiene rubber (HNBR) dispersant in an amount of 0.8 part by weight to 1.5 parts by weight, more preferably 0.8 part by weight to 1.3 parts by weight, and most preferably 1 part by weight to 1.2 parts by weight based on 100 parts by weight of the positive electrode active material. In a case in which the hydrogenated nitrile butadiene rubber (HNBR) dispersant is included in an amount of less than 0.8 part by weight, since a surface area of the positive electrode active material is increased as the dispersion particle size is reduced and the dispersant does not sufficiently surround the increased surface of the positive electrode active material, viscosity may be significantly increased, and, in a case in which the hydrogenated nitrile butadiene rubber (HNBR) dispersant is included in an amount of greater than 1.5 part by weight, since an excessive amount of the dispersant, which is not adsorbed on the surface of the positive electrode active material, is present in the solvent, it may be a cause of increasing the viscosity.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used, for example, N-methylpyrrolidone (NMP) may be used.

The positive electrode active material pre-dispersion may have a viscosity of 2,000 cP to 20,000 cP (25° C.), more preferably 9,000 cP to 14,000 cP (25° C.), and most preferably 10,000 cP to 13,500 cP (25° C.).

Also, the present invention provides a slurry composition for a secondary battery positive electrode which is prepared by further mixing a conductive agent and a binder with the positive electrode active material pre-dispersion composition. Furthermore, the slurry composition for a secondary battery positive electrode may be prepared by further mixing an additional solvent in addition to the mixing of the conductive agent and the binder.

The conductive agent is used to provide conductivity to the electrode, wherein any conductive agent may be used without particular limitation as long as it has electrical conductivity without causing adverse chemical changes in the battery. Specific examples of the conductive agent may be at least one selected from the group consisting of graphite such as natural graphite or artificial graphite; carbon based materials such as carbon black, acetylene black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives. The conductive agent may be included in an amount of 1 wt % to 30 wt % based on a total weight of the slurry composition for a positive electrode.

The binder improves the adhesion between the positive electrode active material particles and the adhesion between the positive electrode active material and a current collector. Specific examples of the binder may be at least one selected from the group consisting of polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), and a fluorine rubber, or copolymers thereof. The binder may be included in an amount of 1 wt % to 30 wt % based on the total weight of the slurry composition for a positive electrode.

Similar to the positive electrode active material pre-dispersion composition, the additional solvent may include dimethyl sulfoxide (DMSO), isopropyl alcohol, N-methylpyrrolidone (NMP), acetone, or water, any one thereof or a mixture of two or more thereof may be used, for example, N-methylpyrrolidone (NMP) may be used, and the same solvent as the solvent in the positive electrode active material pre-dispersion composition may be used.

With respect to the slurry composition for a positive electrode which is prepared by using the positive electrode active material pre-dispersion composition of the present invention, the dispersibility of the lithium iron phosphate-based positive electrode active material is improved, the viscosity of the positive electrode slurry is reduced and flowability is improved to improve processability, and a solid content of the final positive electrode slurry may be increased.

Also, the present invention provides a positive electrode for a secondary battery which is prepared by using the above-described slurry composition for a secondary battery positive electrode. The positive electrode for a secondary battery includes a lithium iron phosphate-based positive electrode active material, a dispersant, a conductive agent, and a binder, wherein the dispersant includes a hydrogenated nitrile butadiene rubber (HNBR). Since the lithium iron phosphate-based positive electrode active material, the dispersant, the conductive agent, and the binder may be the same as those previously described in the positive electrode active material pre-dispersion composition and the slurry composition for a positive electrode, overlapping descriptions thereof are omitted.

As described above, with respect to the positive electrode for a secondary battery of the present invention, since the binder may be uniformly distributed in the positive electrode active material due to the improvement of the dispersibility of the lithium iron phosphate-based positive electrode active material, adhesion may be improved. Also, since a migration phenomenon of the binder, which occurs when the solvent of the slurry is evaporated, may be reduced according to the increase in the solid content of the final positive electrode slurry, the adhesion between a current collector and a positive electrode active material layer may be improved.

Specifically, the positive electrode includes a positive electrode collector and a positive electrode active material layer which is disposed on at least one surface of the positive electrode collector and is formed by using the above-described slurry composition for a positive electrode.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode may be prepared according to a typical method of preparing a positive electrode except that the above-described slurry composition for a positive electrode is used. Specifically, the above-described slurry composition for a positive electrode is coated on the positive electrode collector, and the positive electrode may then be prepared by drying and rolling the coated positive electrode collector.

Also, as another method, the positive electrode may be prepared by casting the above-described slurry composition for a positive electrode on a separate support and then laminating a film separated from the support on the positive electrode collector.

Furthermore, according to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta(0<\beta<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

The negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be preferably used, and a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be more preferably used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

100 parts by weight of a $LiFePO_4$ positive electrode active material having an average particle diameter ($D_{50}$) of 1 μm, 1 part by weight of a HNBR dispersant (AN: 37 wt %, HBD ratio: 21%), and 65.7 parts by weight of an NMP solvent were mixed, and a wetting process was performed for 30 minutes using a Homo mixer. Thereafter, a circulation process was performed at 3,000 rpm for 90 minutes using a bead mill (bead size: 1 mm) to prepare a positive electrode active material pre-dispersion composition.

Example 2

A positive electrode active material pre-dispersion composition was prepared in the same manner as in Example 1 except that 0.5 part by weight of the HNBR dispersant was mixed.

Example 3

A positive electrode active material pre-dispersion composition was prepared in the same manner as in Example 1 except that 2 parts by weight of the HNBR dispersant was mixed.

Example 4

A positive electrode active material pre-dispersion composition was prepared in the same manner as in Example 1 except that 1 part by weight of a HNBR dispersant (AN: 37 wt %, HBD ratio: 12%) was mixed as a dispersant.

Example 5

A positive electrode active material pre-dispersion composition was prepared in the same manner as in Example 1 except that 1 part by weight of a HNBR dispersant (AN: 37 wt %, HBD ratio: 25%) was mixed as a dispersant.

Comparative Example 1

100 parts by weight of a $LiFePO_4$ positive electrode active material having an average particle diameter ($D_{50}$) of 1 μm and 66.7 parts by weight of an NMP solvent were mixed, and a wetting process was performed for 30 minutes using a Homo mixer. Thereafter, a circulation process was performed at 3,000 rpm for 15 minutes using a bead mill (bead size: 1 mm) to prepare a positive electrode active material pre-dispersion composition.

With respect to Comparative Example 1 in which a HNBR dispersant was not added, since a specific surface area and a volume of the positive electrode active material were increased in the bead-mill dispersion process, viscosity was rapidly increased, and thus, the dispersion process was not performed after 15 minutes.

Comparative Example 2

A positive electrode slurry composition was prepared by mixing $LiFePO_4$ having an average particle diameter ($D_{50}$) of 1 μm as a positive electrode active material, carbon black as a conductive agent, and PVDF, as a binder, in a weight ratio of 85:10:5 with an NMP solvent.

With respect to Comparative Example 2 in which a positive electrode active material pre-dispersion was not prepared and the positive electrode active material, the conductive agent, and the binder were added all at once to prepare a positive electrode slurry, since dispersion of the positive electrode active material was not sufficiently performed, coarse particles having a diameter of about 30 μm were generated. When the coarse particles were generated as described above, filter clogging or surface defects, in which grains were generated on a coating surface, may occur in a positive electrode slurry coating process.

Experiment Example

Measurement of Changes in Particle Size and Viscosity with Dispersion Time

During the preparation of the positive electrode active material pre-dispersion compositions of Examples 1 to and Comparative Example 1, changes in particle size and viscosity were measured every 15 minutes in the bead-mill dispersion process.

The particle size was measured using a Malvern Mastersizer 3000, the particle size was measured in such a manner that 3 ml of each positive electrode active material pre-dispersion was diluted 1,000 times and the particle size was measured every 15 minutes, and the results thereof are presented in Table 1 and FIG. 1 below.

The viscosity was measured using a Brookfield DV2T viscometer, the viscosity was measured in such a manner that 250 ml of each positive electrode active material pre-dispersion was put in a beaker and the viscosity was measured every 15 minutes, and the results thereof are presented in Table 2 and FIG. 2 below.

TABLE 1

| | Amount of dispersant (parts by weight) | Particle diameter ($D_{50}$) (µm) versus dispersion time | | | | | |
|---|---|---|---|---|---|---|---|
| | | 15 min | 30 min | 45 min | 60 min | 75 min | 90 min |
| Example 1 | 1 | 1.03 | 0.95 | 0.87 | 0.84 | 0.80 | 0.77 |
| Example 2 | 0.5 | 1.07 | 0.99 | 0.93 | 0.86 | 0.82 | 0.79 |
| Example 3 | 2 | 1.03 | 0.94 | 0.87 | 0.82 | 0.77 | 0.74 |
| Example 4 | 1 | 1.05 | 0.98 | 0.90 | 0.88 | 0.85 | 0.81 |
| Example 5 | 1 | 1.03 | 0.94 | 0.86 | 0.82 | 0.78 | 0.74 |
| Comparative Example 1 | — | 1.28 | — | — | — | — | — |

TABLE 2

| | Amount of dispersant (parts by weight) | Viscosity (cP, 25° C., 12 rpm, #6-pin) versus dispersion time | | | | | |
|---|---|---|---|---|---|---|---|
| | | 15 min | 30 min | 45 min | 60 min | 75 min | 90 min |
| Example 1 | 1 | 1,917 | 3,333 | 4,417 | 6,667 | 9,083 | 13,500 |
| Example 2 | 0.5 | 2,583 | 4,750 | 8,830 | 14,580 | 22,670 | 29,920 |
| Example 3 | 2 | 5,500 | 9,417 | 11,580 | 13,750 | 16,330 | 19,580 |
| Example 4 | 1 | 2,840 | 4,120 | 5,240 | 7,790 | 13,520 | 18,520 |
| Example 5 | 1 | 1,880 | 3,150 | 4,140 | 5,520 | 8,010 | 11,670 |
| Comparative Example 1 | — | 28,000 | — | — | — | — | — |

Figure 2:
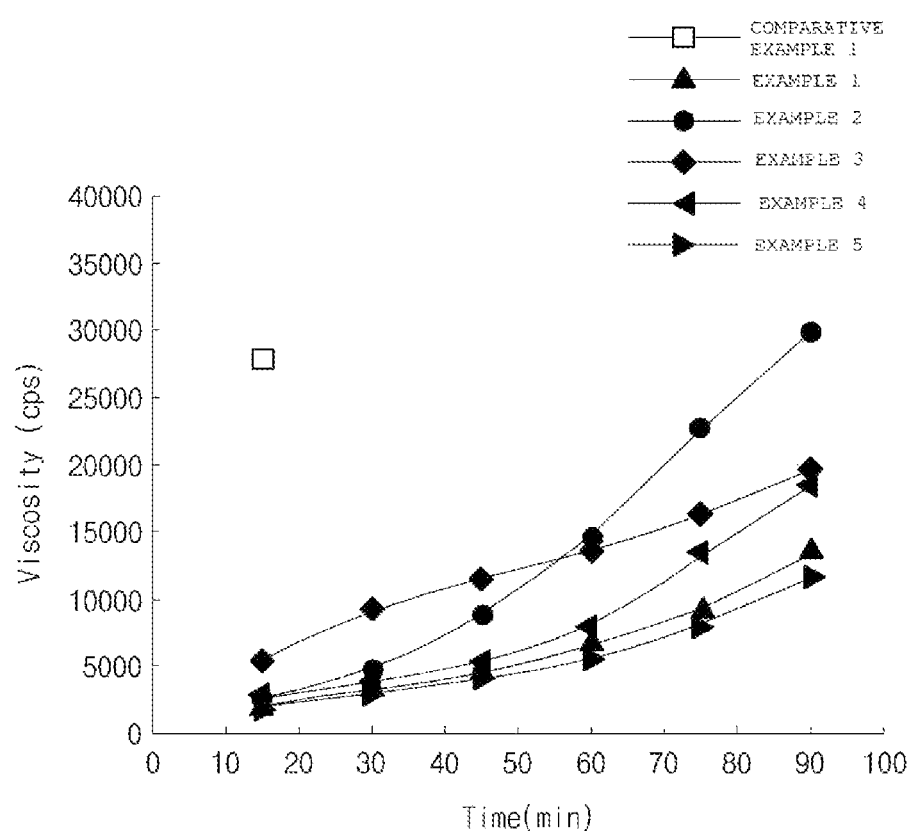
FIG. 2 is a graph illustrating a change in viscosity vs. dispersion time of the positive electrode active material pre-dispersions according to Examples 1 to 5 and Comparative Example 1.

Referring to Tables 1 and 2 and FIGS. 1 and 2, with respect to Comparative Example 1 in which a HNBR dispersant was not mixed, since dispersion efficiency was reduced, the particle diameter was significantly large during dispersion for 15 minutes. Specific surface area and volume of the positive electrode active material were increased to rapidly increase viscosity, and thus, further dispersion was not observed after 15 minutes. In contrast, with respect to each of Examples 1 to 5 in which the HNBR dispersant was mixed and pre-dispersion was performed according to the embodiment of the present invention, the positive electrode active material was dispersed such that the particle diameter was less than 1 µm. Among them, with respect to Examples 1, 4 and 5 in which the dispersant was mixed in an amount of 1 part by weight, since an appropriate amount of the dispersant was used while the dispersion particle size was reduced, the positive electrode active material pre-dispersion having low viscosity may be prepared.

The invention claimed is:

1. A positive electrode active material pre-dispersion composition comprising
   a lithium iron phosphate-based positive electrode active material,
   a dispersant, and
   a solvent,
   wherein the dispersant comprises a hydrogenated nitrile butadiene rubber,
   wherein the dispersant is included in an amount of 0.8 parts by weight to 1.5 parts by weight based on 100 parts by weight of the positive electrode active material,
   wherein the dispersant comprises a repeating unit derived from acrylonitrile in an amount of 20 wt % to 50 wt % based on a total weight of the hydrogenated nitrile butadiene rubber
   wherein a hydrogenation butadiene ratio in the dispersant satisfies Equation 1:

$$10(\%) \leq \text{HBD wt \%}/(\text{BD+HBD}) \text{ wt \%} \times 100 \leq 25(\%) \quad [\text{Equation 1}]$$

wherein, in Equation 1, HBD wt % is weight % of a hydrogenated butadiene derived repeating unit based on the total weight of the hydrogenated nitrile butadiene rubber, and (BD+HBD) wt % is weight % of a butadiene-derived repeating unit and the hydrogenated butadiene derived repeating unit based on the total weight of the hydrogenated nitrile butadiene rubber.

2. The positive electrode active material pre-dispersion composition of claim 1, wherein the dispersant has a weight-average molecular weight (MW) of 10,000 to 700,000.

3. The positive electrode active material pre-dispersion composition of claim 1, wherein the positive electrode active material pre-dispersion has a viscosity of 2,000 cP to 20,000 cP at 25° C.

4. The positive electrode active material pre-dispersion composition of claim 1, wherein the lithium iron phosphate-based positive electrode active material is a primary particle having an average particle diameter of less than 2 μm.

5. The positive electrode active material pre-dispersion composition of claim 1, wherein the lithium iron phosphate-based positive electrode active material is represented by Formula 1:

$$Li_{1+a}Fe_{1-x}M_xPO_{4-b}A_b \qquad \text{[Formula 1]}$$

wherein, in Formula 1, M is at least one selected from the group consisting of manganese, nickel, cobalt, copper, scandium, titanium, chromium, vanadium, and zinc, A is at least one selected from the group consisting of sulfur, selenium, fluorine, chlorine, and iodine, $-0.5<a<0.5$, $0\leq x<0.5$, and $0\leq b\leq 0.1$.

6. A slurry composition for a secondary battery positive electrode, the slurry composition further comprising a conductive agent and a binder in addition to the positive electrode active material pre-dispersion composition of claim 1.

7. The slurry composition for a secondary battery positive electrode of claim 6, wherein the conductive agent comprises at least one of carbon black, graphite, carbon fibers, carbon nanotubes, acetylene black, channel black, furnace black, lamp black, thermal black, metal powder, metal fibers, conductive metal oxides, conductive whiskers, or conductive polymers.

8. The slurry composition for a secondary battery positive electrode of claim 6, wherein the binder comprises at least one of polyvinylidene fluoride, polyvinylidene fluoride-hexafluoropropylene copolymer, polyvinyl alcohol, polyacrylonitrile, carboxymethyl cellulose, starch, hydroxypropyl cellulose, regenerated cellulose, polyvinylpyrrolidone, tetrafluoroethylene, polyethylene, polypropylene, an ethylene-propylene-diene monomer, a sulfonated EPDM, a styrene-butadiene rubber, and a fluorine rubber, or a copolymer thereof.

9. A positive electrode for a secondary battery which is prepared by using the slurry composition for a secondary battery positive electrode of claim 6, disposed on at least one surface of a positive electrode collector.

10. A positive electrode for a secondary battery, the positive electrode comprising a lithium iron phosphate-based positive electrode active material, a dispersant, a conductive agent, and a binder,
wherein the dispersant comprises a hydrogenated nitrile butadiene rubber,
wherein the dispersant is included in an amount of 0.8 part by weight to 1.5 parts by weight based on 100 parts by weight of the positive electrode active material,
wherein the dispersant comprises a repeating unit derived from acrylonitrile in an amount of 20 wt % to 50 wt % based on a total weight of the hydrogenated nitrile butadiene rubber,
wherein a hydrogenated butadiene ratio in the dispersant satisfies Equation 1:

$$10(\%)\leq \text{HBD wt \%}/(\text{BD+HBD}) \text{ wt \%}\times 100\leq 25(\%) \qquad \text{[Equation 1]}$$

wherein, in Equation 1, HBD wt % is weight % of a hydrogenated butadiene-derived repeating unit based on a total weight of the hydrogenated nitrile butadiene rubber, and (BD+HBD) wt % is weight % of a butadiene-derived repeating unit and the hydrogenated butadiene-derived repeating unit based on the total weight of the hydrogenated nitrile butadiene rubber.

11. The positive electrode for a secondary battery of claim 10, wherein the dispersant has a weight-average molecular weight of 10,000 to 700,000.

12. The positive electrode for a secondary battery of claim 10, wherein the lithium iron phosphate-based positive electrode active material is a primary particle having an average particle diameter of less than 2 μm.

13. A lithium secondary battery comprising the positive electrode for a secondary battery of claim 9, a negative electrode disposed to face the positive electrode, a separator disposed between the positive electrode and the negative electrode, and an electrolyte.

* * * * *